(12) United States Patent
Scholz et al.

(10) Patent No.: US 7,081,082 B2
(45) Date of Patent: Jul. 25, 2006

(54) METHOD FOR THE SEPARATION OF BLOOD PLASMA PARTICLES FROM A BLOOD PLASMA SUSPENSION

(75) Inventors: Jürgen Scholz, Leverkusen (DE); Markus Longerich, Köln (DE); Ernst-Ulrich Himmen, Odenthal (DE); Ulrich Esser, Kürten (DE); Rajesh Sharma, Cary, NC (US); Anshuman V. Patwardhan, Cary, NC (US)

(73) Assignee: Bayer Aktiengesellschaft, Leverkusen (DE)

( * ) Notice: Subject to any disclaimer, the term of this patent is extended or adjusted under 35 U.S.C. 154(b) by 84 days.

(21) Appl. No.: 10/485,765

(22) PCT Filed: Jul. 30, 2002

(86) PCT No.: PCT/EP02/08444

§ 371 (c)(1),
(2), (4) Date: May 13, 2004

(87) PCT Pub. No.: WO03/013686

PCT Pub. Date: Feb. 20, 2003

(65) Prior Publication Data

US 2005/0006319 A1    Jan. 13, 2005

(30) Foreign Application Priority Data

Aug. 10, 2001 (DE) ................ 101 39 466

(51) Int. Cl.
*B04B 1/08* (2006.01)
*B04B 11/06* (2006.01)
*B04B 15/02* (2006.01)
*B04B 15/08* (2006.01)

(52) U.S. Cl. ................ 494/37; 494/10; 494/14; 494/25; 494/61; 494/70; 210/782

(58) Field of Classification Search ............... 494/1–4, 494/13–14, 42, 46, 37, 61, 10, 25, 56, 68–73; 210/782, 787, 742, 789

See application file for complete search history.

(56) References Cited

U.S. PATENT DOCUMENTS

| 3,981,437 A * | 9/1976 | Hemfort et al. ............... 494/14 |
| 5,328,441 A | 7/1994 | Carr |
| 5,743,840 A | 4/1998 | Carr |
| 6,267,899 B1 * | 7/2001 | Greig et al. ................. 210/781 |
| 6,390,964 B1 * | 5/2002 | Mackel ......................... 494/14 |

(Continued)

FOREIGN PATENT DOCUMENTS

| DE | 198 46 535 A1 | 4/2000 |
| DE | 19922236 A1 * | 11/2000 |
| WO | WO 00/67911 | 11/2000 |

*Primary Examiner*—Charles E. Cooley
(74) *Attorney, Agent, or Firm*—Norris McLaughlin & Marcus PA

(57) ABSTRACT

Method for separating blood plasma particles from a blood plasma suspension in a self-discharging centrifuge having two or more discharge slits and axially stacked baffle plates, in which the blood plasma particles are separated from the liquid phase by centrifuging and removal of the liquid phase, suctioning off liquid remaining in the drum after separation of the blood plasma particles and discharging the sediment of solid blood plasma particles from the drum by centrifugal force into a collecting container underneath the drum, the drum and the blood plasma sediment being cooled during one or more of the process steps.

17 Claims, 1 Drawing Sheet

U.S. PATENT DOCUMENTS

| | | |
|---|---|---|
| 6,468,198 B1 * | 10/2002 | Mackel .................. 494/37 |
| 6,530,871 B1 * | 3/2003 | Mackel et al. .......... 494/37 |
| 6,544,162 B1 * | 4/2003 | Van Wie et al. ........ 494/37 |
| 6,648,809 B1 * | 11/2003 | Mackel et al. .......... 494/26 |
| 6,827,680 B1 * | 12/2004 | Niemerg ................. 494/70 |
| 2004/0023783 A1 * | 2/2004 | Niemerg ................. 494/70 |
| 2004/0176233 A1 * | 9/2004 | Himmen et al. ........ 494/14 |
| 2005/0006319 A1 * | 1/2005 | Scholz et al. .......... 210/787 |

* cited by examiner

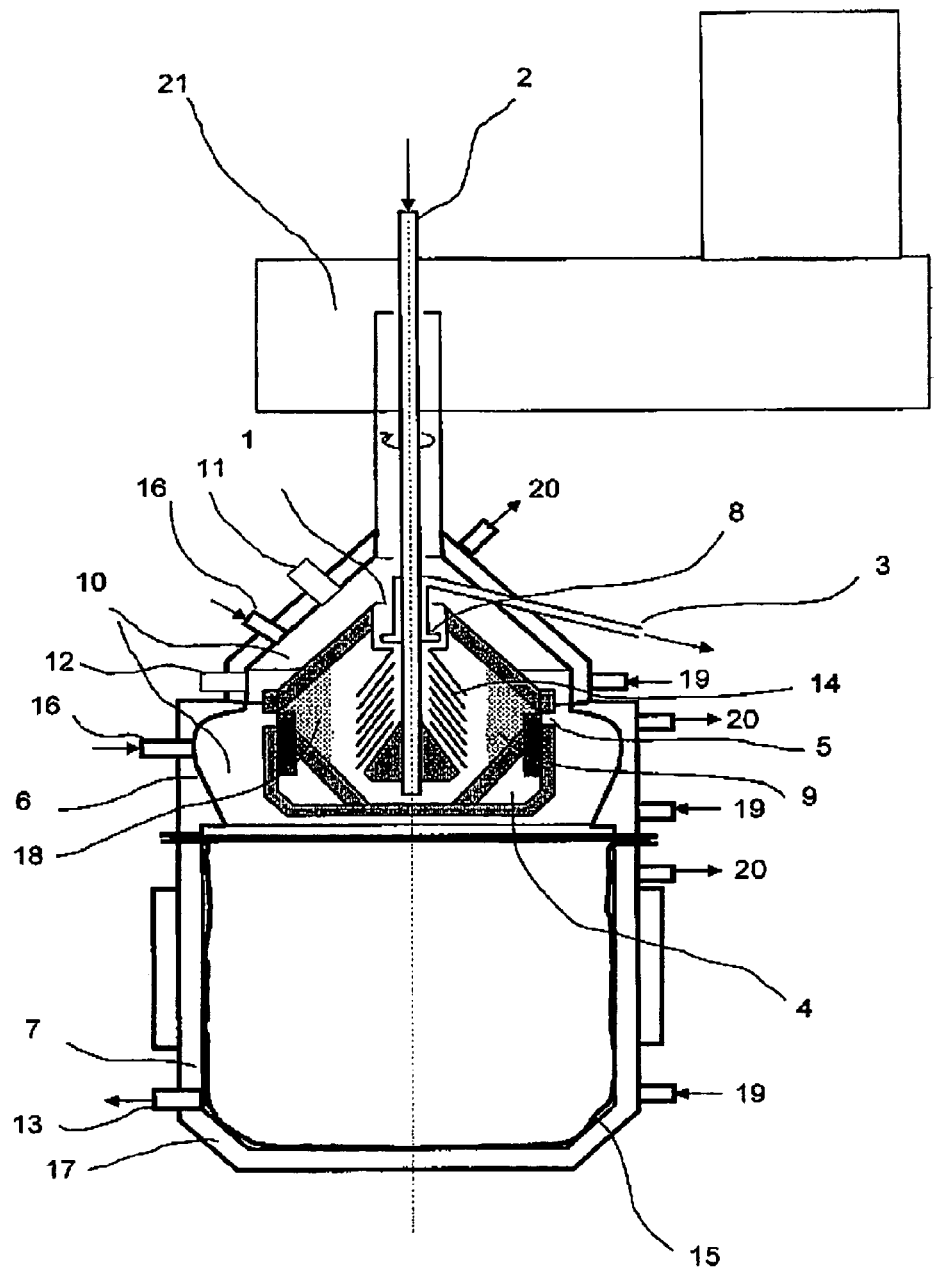

METHOD FOR THE SEPARATION OF BLOOD PLASMA PARTICLES FROM A BLOOD PLASMA SUSPENSION

This is a 371 of PCT/EP02/08444 filed 30 Jul. 2002 (international filing date).

The invention relates to a method for the separation of blood plasma particles from the liquid phase of a blood plasma suspension, such as typically obtained in the fractionation of human blood plasma.

BACKGROUND OF THE INVENTION

According to the prior art, blood plasma suspensions are presently separated using vertical solid-bowl centrifuges or chamber separators or by filtration methods.

Filtration of blood plasma is carried out via filter presses or vertically arranged rotary pressure filters. The throughput capacity which can be achieved thereby is relatively high. However, in most cases a filter aid has to be added to the suspension, namely a porous, finely particulate material which increases the permeability of the filter cake forming in the filter. This has a significant influence on the procedure for further processing to give the end product.

When using filters for the separation of blood plasma particles, the main problem, however, lies in the complicated manual handling which is needed for emptying the filter and cleaning it, and in the associated risk of contamination to which operating staff and product are equally exposed. A further disadvantage of this method is that the filters used according to the prior art cannot be cooled, and the procedure therefore has to be carried out at relatively low ambient temperatures. This entails high costs associated with air conditioning.

Alternatively, the separation of blood plasma particles in chamber separators is known. Chamber separators are characterized by a drum which is mounted on a vertical spindle, without automatic discharge of the separated solid, and which is filled from above via a vertical line and, in order to improve the clarification effect, is in most cases divided into a plurality of chambers. These centrifuges can be cooled via the housing. The throughput capacity is relatively high. However, the use of chamber separators for the separation of blood plasma particles also has the disadvantage that the drum and other component parts coming into contact with the product have to be removed and cleaned by hand, which exposes operating staff and product to a high risk of contamination. Moreover, with this type of machine, no design is known in which the drive unit is spatially separate from the processing unit, which separation is desirable in view of the increasing hygiene demands.

A more automated method for the separation of blood plasma particles is possible using a vertical solid-bowl centrifuge with scraper device. It is known that this type of centrifuge permits automatic discharge of solid and automated cleaning of the drum and of the parts coming into contact with the product. Centrifuges of this type achieve their separating efficiency principally by means of very high drum speeds. However, the separating efficiency is limited because the surface area on which the blood plasma particles are deposited is restricted for construction-related reasons. The high peripheral speeds which arise in centrifuges of this type require a relatively high level of cooling in order for the drum and the product situated in the drum to be kept within the desired temperature range. For this reason, the space surrounding the drum is often placed under vacuum in order to reduce the air friction heat. The solid is discharged via a scraper system which automatically scrapes the deposited solid out of the drum. The solid then falls into a container arranged underneath the drum. Because of their relatively complicated structure, the use of vertical solid-bowl centrifuges with scraper system for separation of blood plasma particles is relatively expensive, and the assembly operations are often laborious.

Against the background of the known methods for the separation of blood plasma particles, the invention aims to create the essential advantages of said manual methods, i.e. the use of a chamber separator or filtration, together with the essential advantages of the automated method, i.e. similar to the use of a vertical solid-bowl centrifuge. Therefore, the object of the invention is to make available an inexpensive and straightforward but also fully automated centrifuging method with a high throughput capacity of the equipment for the separation of blood plasma particles from a suspension, which method, however, permits cooling of the drum without the need for a vacuum in the area of rotation of the drum and ensures separation of the processing space and drive space in order in particular to satisfy the strict hygiene requirements. Assembly operations on machines used for this method are to be able to be carried out comparatively easily.

According to the invention, this object is achieved by using an automated centrifuge with baffle plates for increasing the active surface area for separation of blood plasma particles from a blood plasma suspension.

SUMMARY OF THE INVENTION

The subject matter of the invention is a method for the separation of blood plasma particles from a blood plasma suspension in a self-discharging centrifuge, having at least an optionally coolable housing, an admission line for the suspension, a removal line for the clarified liquid, a drum, which in particular is suspended and is connected to a drive part lying above it and, if appropriate, is provided with two or more discharge slits and axially stacked baffle plates, and an optionally coolable collecting container, the method consisting at least of the following method steps (I) separating the solid blood plasma particles from the liquid phase by centrifuging and removal of the liquid phase, (II) suctioning off the liquid still present in the drum after separation of the blood plasma particles, in particular via the admission line, the drum preferably being brought to a stop at least for a short time, in particular for at least 5 seconds, particularly preferably for at least 10 seconds, (III) discharging the sediment of solid blood plasma particles from the drum, by centrifugal force and opening of the drum, into a collecting container located in particular underneath the drum.

DETAILED DESCRIPTION

A method is preferred which is characterized in that the temperature of the drum is regulated before method step I), in particular brought to a temperature of ±5° C. in relation to the temperature of the inflowing blood plasma suspension. The temperature regulation of the drum before method step I) takes place especially preferably with the drum rotating, very particularly preferably at a drum speed in the range of from 20% to 70% of the drum speed used for the centrifuging in method step I).

In this connection, the drum speed can be constant throughout the period of precooling or it can be increased in two or more steps or continuously.

The preliminary temperature regulation of the drum before method step I) takes place in particular by feeding a precooling liquid via the admission line, preferably at a temperature in the range of ±5° C. relative to the inflow temperature of the blood plasma suspension.

Particularly advantageous is a chosen method in which, after the preliminary temperature regulation of the drum before method step I), the precooling liquid is suctioned off from the drum via the admission line.

During the suctioning, the capillary liquid located between the baffle plates can be centrifuged off in one or more intermediate centrifuging steps, in which case the suctioning, during rotation of the drum, can be completely interrupted, partially interrupted or not interrupted at all.

A further preferred variant of the method is one in which, during method step I), the liquid phase separated in the drum is taken up by a pump device positioned above the baffle plates and is removed via a removal line.

To limit the temperature of the clarified liquid which is removed relative to the temperature of the inflowing suspension, the clarified liquid can run off free of pressure or at a pressure restricted to the pressure drops in the conduit.

Between method steps I) and II), in an additional centrifuging phase with the suspension delivery switched off, it is particularly preferred for the blood plasma sediment to be further compacted at a drum speed of 80% to 130% of the separation speed in step I).

In method step II), the residual liquid is particularly preferably suctioned off in one or more intermediate centrifuging steps.

The method for the separation of blood plasma particles from a blood plasma suspension is preferably carried out such that, in method step III), the blood plasma sediment is discharged by opening the discharge slits of the drum, at a drum speed of 30% to 130% of the separation speed in step I), preferably at the separation speed.

In a further preferred modification of the method, the blood plasma sediment discharged from the drum is collected in a flexible bag which is fitted into the collecting container and which is held against the inner wall of the collecting container in particular by a vacuum which a vacuum attachment generates between the bag and the inner wall of the collecting container.

In this connection, the bag can also remain in the collecting container, during said method steps I) to III) and during said optional preliminary and intermediate steps, up to a suitable degree of filling.

In a further preferred embodiment of the method, after method step III), the method steps I) to III) are immediately repeated, until the collecting container is filled with blood plasma sediment to a predetermined degree, and the sediment is separated off for further processing.

During one or more of method steps I) to III) and one or more of the intermediate steps, the drum and the discharged blood plasma sediment are cooled, independently of one another, by cooling the jacket of those parts of the centrifuge surrounding them, in particular of the housing and/or of the collecting container, by means of a liquid cooling medium, in the temperature range of +2° C. to −50° C.

A specially chosen variant of the method is characterized in that during the entire method, or during selected steps thereof, the drum and the sediment is cooled by feeding liquid nitrogen into the space surrounding the drum, in particular via one or more attachments arranged on the housing, on the baffle ring or on the collecting container, and the gaseous nitrogen is removed via an exhaust gas pipe preferably positioned in the housing. The cooling of the drum and of the sediment particularly preferably takes place at least before removal of the sediment. Liquid nitrogen is preferably introduced simultaneously into the upper area and lower area of the of the space surrounding the drum.

In a preferred variant of the method, for the purpose of checking the procedure, the surface temperature of the drum is checked at one or more locations during the method, in particular by a temperature-measuring device which is preferably arranged on the housing and conducts contactless measurement.

Centrifuges with baffle plates are typically equipped with a central inlet for the suspension and with conical plates which are located in the drum and which, by means of the centrifugal force present and the short sedimentation paths and the large active separating surface area, serve as collectors for fine particles. The particles collected slide along the plates in the direction toward the greatest diameter of the drum and into the collection space for solids which surrounds the plates. The clarified liquid is removed on the inside of the plates by means of a so-called scoop designed as a pump impeller, under pressure or virtually free of pressure. Centrifuges with baffle plates are known which have a standing or suspended drum. A centrifuge which is suitable in principle and can be adapted to the present method is known from DE 198 46 535 A1 (corresponding to U.S. Pat. No. 6,530,871).

The method according to the invention for the separation of blood plasma particles is distinguished, for example compared to the use of a vertical solid-bowl centrifuge, especially by the fact that the throughput capacity of the equipment is higher, at a comparatively lower speed of rotation, and thus a more cost-effective method can be realized. Furthermore, on account of their simple design, preferably used centrifuges with baffle plates involve comparatively low investment costs and their construction means that they are easier to assemble and maintain. As the speeds of rotation are lower compared to the vertical solid-bowl centrifuge, the air friction heat which develops in a centrifuge with baffle plates is relatively low. It is therefore not necessary to operate the centrifuge under vacuum in order to maintain the low temperatures needed for blood plasma products. The drum and the product can therefore simply be cooled in particular by cooling the jacket of the component parts surrounding the drum or, if necessary, cooling can be assisted by injecting liquid nitrogen into the space surrounding the drum.

Compared to the methods which separate blood plasma particles with the aid of chamber separators or by filtration, the method according to the invention is distinguished especially by a significantly higher degree of automation. Also, in contrast to methods using chamber separators and filtration, the cleaning of the drum and of the parts coming into contact with the product can be automated in the case of a centrifuge with baffle plates. The risk of contamination of operating staff by the product or of the product by soiling is therefore lower in the method according to the invention. This takes account of the increased hygiene requirements, which may also possibly increase still further in future.

The method according to the invention thus combines the essential advantages of methods using vertical solid-bowl centrifuges, such as automatic product discharge and automatic cleaning, with the advantages of the methods using chamber separators or filters, such as the high throughput capacities, simple structural components and cost-effective operation.

BRIEF DESCRIPTION OF THE DRAWINGS

The method according to the invention is explained in more detail below by way of example and with reference to FIG. 1. FIG. 1 shows a partial cross section through a centrifuge used in the method according to the invention.

EXAMPLE

The method is basically divided into three method steps. These are: separating the blood plasma particles from the blood plasma suspension (method step I), suctioning off the liquid still present in the drum 4 (method step II), and discharging the blood plasma sediment from the drum 4 and then diverting it into a collecting container 7 located underneath the drum 4 by way of a deflector ring 6 (method step III).

Since blood plasma is very temperature-sensitive, the drum 4 is precooled before method step I. This is done by feeding a precooling liquid through the admission line 2, while the drum is rotating, and cooling the jacket of some or all of the structural parts surrounding the drum, such as housing 1, deflector ring 6 or collecting container 7, and by feeding liquid nitrogen into the space 10 surrounding the drum via one or more attachments 16 arranged on the housing 1, on the deflector ring 6 or on the collecting container 7. The drum which has thus been brought to the desired temperature is then emptied, while stationary, by suctioning off the precooling liquid through the admission line 2, in order to avoid contamination of the product by the precooling liquid. Since precooling liquid may remain between the gaps of the baffle plates 14 because of the capillary effect, the drum 4 is set in rotation during the suctioning or during an interruption in the suctioning operation, by which means any precooling liquid still located between the baffle plates 14 is centrifuged out and, after the drum has been stopped, also suctioned off.

During method step I), the blood plasma suspension is fed via the admission line 2 into the lower area of the drum 4, the incoming suspension being gently pre-accelerated by rotation of the admission line 2 together with the drum 4 by means of the drive 21. Above the baffle plates 14, the clarified solution is taken up by a so-called scoop 8, which is designed like a pump impeller, and removed via a line 3 connected to the latter. To reduce the temperature of the outflowing clarified liquid relative to the temperature of the inflowing suspension, the clarified liquid can run off through the line 3 free of pressure.

At the end of method step I), when the collecting space 9 for solids which surrounds the baffle plates 14 has been at least partially filled with solid material a so-called secondary centrifugation phase begins, if necessary, in which the drum 4 is kept rotating, but without any more fresh suspension being delivered, in order in this way, by means of the centrifugal forces, to compact the blood plasma sediment located in the drum 4 and thus further reduce the liquid content.

After method step I) or the secondary centrifugation phase, and before method step III), the liquid still present in the drum 4 is suctioned off via the admission line 2, with the drum 4 stationary, in method step II). In this way, the blood plasma sediment can be discharged without liquid, by which means the solid concentration of the discharged blood plasma sediment can be substantially increased.

To start method step III), the drum 4 is accelerated, and the discharging of the blood plasma sediment 18 is started by opening the discharge slits 5.

The blood plasma sediment 18 which is centrifuged out is deflected by means of a so-called deflector ring 6 in the direction of the collecting container 7 underneath it and is taken up either by the collecting container 7 itself or, as in FIG. 1, by a flexible bag 15 which has been fitted into the collecting container 7. When using a flexible bag 15, the latter is held firm optionally against the inside wall of the collecting container 7 by means of a vacuum which one or more vacuum attachments 13 generate at the collecting container 7 between the bag 15 and the inside wall of the collecting container 7. The flexible bag 15 is in this case of such a stable design that it is able to be fitted into the collecting container 7 before the start of the method and can remain in the collecting container 7 throughout the method and withstands the shear forces resulting from the air friction from the rotation of the drum 4 and also the forces arising upon discharging of the blood plasma sediment.

After the blood plasma sediment has been discharged, it is possible, depending on the degree of filling of the collecting container 7 or flexible bag 5, either for a new method cycle to be immediately begun with method step I) or for the collecting container 7 or the bag 15 lying in the collecting container 7 first to be changed, with the drum 4 stationary, or if necessary cleaned, before a new cycle is begun with method step I).

When changing the collecting container or the bag 15 lying in the collecting container 7, the discharged blood plasma sediment is if necessary cooled before removal, with the drum 4 rotating and with liquid nitrogen 16 being fed in, before it is removed.

Throughout the entire method, or only during individual method steps or intermediate steps, the drum 4 and the product is alternately or jointly cooled by cooling the jacket of some or all of the structural parts surrounding the drum, such as the housing 1, the deflector ring 6 or the collecting container 7 (jacket 17). The cooling agent (glycol/water; 50:50) is introduced via the attachment 19 and removed via the attachment 20. The drum and the sediment is additionally cooled by feeding liquid nitrogen, through one or more attachments 16 arranged on the housing 1, on the deflector ring 6 or on the collecting container 7, into the space 10 surrounding the drum, especially into the upper area and lower area of the space 10 surrounding the drum. Nitrogen gas is removed again via an exhaust gas pipe 11.

During individual chosen method steps, the surface temperature of the drum 4 is measured by a temperature-measuring device 12 which is arranged on the housing 1 and conducts contactless measurement. This has the particular advantage that, by adjusting the centrifuge cooling, the surface temperature of the drum 4 can be adapted to the intake temperature of the blood plasma suspension, and it is thus possible to avoid heat being conducted from outside into the drum with consequent heating of the blood plasma sediment separated in the drum.

Example 1

With the described method, it was possible for 22.6 kg of a blood plasma protein to be separated and discharged fully automatically from the drum in 5 cycles within 70 minutes. About 30% of this time was taken up by the separation of the blood plasma particles in method step I. Between method steps I and II, a secondary centrifuging phase of 5 minutes was performed in order to further compact the blood plasma sediment separated in the drum.

The drum speed during separation of the blood plasma particles (method step I) was 7000 l/min. Before the start of method step I, the drum 4 was precooled by feeding in a water/ethanol mixture as precooling liquid with a temperature in the range of –5° C. to –10° C. This precooling was assisted by cooling the jacket of the housing 1 (–10° C.), of the deflector ring 6 (–20° C.) and of the collecting containers 7 (–20° C.) and by feeding in liquid nitrogen at housing 1 and deflector ring 6. This cooling was also maintained for subsequent method steps II and III. During the precooling phase, the drum speed was first set at 4000 l/min and, after a drum temperature of about –4° C. had been reached, was set at 7000 l/min. In this way it was possible to reach a drum temperature of 4 to –6° C. measured by a contactless temperature-measuring device 12.

The temperature of the blood plasma suspension fed in through the admission line 2 during method step I was ca. –5° C. By means of the pressure-free removal of the clarified blood plasma liquid via the removal line 3, it was possible to limit the heating of the liquid, relative to the intake temperature, to only about 1.0° C. After the final method cycle, the discharged blood plasma sediment was cooled in a 5-minute cooling phase at a drum speed of 1000 l/min and with introduction of liquid nitrogen into the space 10 surrounding the drum 4. The discharged blood plasma sediment thereafter had a temperature of –5° C. to –6° C.

Example 2

In another example, another blood plasma fraction was separated off. In this case, it was possible for 16.3 kg of blood plasma sediment to be separated off and removed fully automatically in 4 cycles within 81 minutes. Ca. 22% of the time was taken up by the separation of the blood plasma particles in method step I. Between method steps I and II, a secondary centrifuging phase of in each case 15 minutes was performed in order to compact the blood plasma sediment separated off in the drum.

The drum speed during separation of the blood plasma particles was 7000 l/min in this case too. Before the start of method step I, the drum 4 was precooled by feeding in a water/ethanol mixture as precooling liquid via the admission line 2 with a temperature in the range of –10° C. to –13° C. The jacket cooling of the structural parts surrounding the drum 4, namely housing 1, deflector ring 6 and collecting container 7, was in the range of –17° C. to –23° C. The cooling was once again assisted by feeding in liquid nitrogen at housing 1 and deflector ring 6 (attachment 16). This cooling was also maintained for subsequent method steps II and III. In the precooling phase, the drum speed was raised in stages from an initial 4000 l/min to 7000 l/min here as well.

During the precooling phase, the drum speed was first set at 4000 l/min and, after a drum temperature of about –5° C. had been reached, was set to 7000 l/min. In this way it was possible to reach and to maintain a drum temperature of –1° C. to –7° C. The temperature of the blood plasma suspension fed in through the admission line 2 during method step I was –6° C. to –7° C. Here once again, the clarified liquid was removed free of pressure via the removal line 3. The heating of the liquid relative to the intake temperature was in this case <1° C. In this test, no further cooling phase at low drum speed was needed to reach the desired temperature of the discharged blood plasma. The discharged blood plasma sediment had a temperature of –5° C. to –6° C.

The invention claimed is:

1. A method for the separation of blood plasma particles from a blood plasma suspension in a self-discharging centrifuge, having at least a housing (1) that is optionally coolable, an admission line (2) for the suspension, a removal line (3) for the clarified liquid, a drum (4), which is suspended and is connected to a drive part lying above it, and, is provided with two or more discharge slits (5) and axially stacked baffle plates (14), and a collecting container (7) that is optionally coolable, the method comprising at least the following method steps (I) separating the solid blood plasma particles from the liquid phase, as a sediment, by centrifuging the blood plasma suspension and removal of the liquid phase, (II) suctioning off the liquid still present in the drum (4) after separation of the blood plasma particles, the drum optionally being brought to a stop at least for at least 5 seconds, (III) discharging the sediment of solid blood plasma particles from the drum (4), by centrifugal force and opening of the drum (4), into a collecting container (7) located underneath the drum (4)

wherein during one or more of steps (I) to (III) the drum and the blood plasma sediment are cooled.

2. The method as claimed in claim 1, wherein the temperature of the drum (4) is brought to a temperature of ±5° C. in relation to the temperature of the inflowing blood plasma suspension before step I.

3. The method as claimed in claim 2, wherein said temperature adjustment of the drum (4) before method step I) is made with the drum (4) rotating.

4. The method as claimed in claim 2, wherein said temperature adjustment of the drum (4) before method step I) is made by feeding a precooling liquid via the admission line (2).

5. The method as claimed in claim 4, wherein, after said temperature adjustment of the drum (4) before method step I), the precooling liquid is auctioned off from the drum (4) via the admission line (2).

6. The method as claimed in claim 2, wherein, during method step I), the liquid phase separated in the drum (4) is taken up by a scoop (8) positioned above the baffle plates and is removed via a removal line (3).

7. The method as claimed in claim 1, wherein, between method steps I) and II), in an additional centrifuging phase, the blood plasma sediment is further compacted at a drum speed of 80% to 130% of the separation speed in step I).

8. The method as claimed in claim 1, wherein step (II) comprises one or more spinning steps.

9. The method as claimed in claim 1, wherein, in method step III), the blood plasma sediment is discharged by opening the discharge slits (5) of the drum, at a drum speed of 30% to 130% of the separation speed in step I).

10. The method of claim 9, where said discharge slits are opened at a drum speed which is equal to the drum speed of step (I).

11. The method as claimed in claim 1 wherein the blood plasma sediment discharged from the drum (4) is collected in a flexible bag (15) which is fitted into the collecting container (7) and which is held against the inner wall of the collecting container (7) by a vacuum which is generated by a vacuum attachment (13) between the bag (15) and the inner wall of the collecting container (7).

12. The method as claimed in claim 1, wherein, after method step III), the method steps I) to III) are immediately repeated, until the collecting container (7) is filled with blood plasma sediment to a predetermined degree, and the sediment is removed for further processing.

13. The method as claimed in any one of claims 1 through 12, wherein the drum (4) and the discharged blood plasma sediment are cooled, independently of one another, by cooling a jacket on those parts of the centrifuge surrounding them, parts of the housing (1) and/or of the collecting container (7) with a liquid cooling medium, in the temperature range of +2° C. to −50° C.

14. The method of claim 13, wherein said parts which are cooled are the housing, or the collecting container, or both.

15. The method as claimed in any one of claims 1 through 12, wherein during the entire method, or during selected steps thereof, at least before removal of the sediment the drum and the sediment is cooled by feeding liquid nitrogen into a space (10) surrounding the drum (4), and the gaseous nitrogen is removed via an exhaust gas pipe (11) preferably positioned in the housing.

16. The method as claimed in claim 1, wherein, during the method, the surface temperature of the drum (4) is checked at one or more locations by a temperature-measuring device (12) which is optionally arranged on the housing (1) and conducts contactless measurement.

17. The method of claim 1, wherein said drum is brought to a stop for at least 10 seconds in step (II).

\* \* \* \* \*